July 15, 1924.
E. GATHMANN ET AL
SHRINK HEAD CASING FOR INGOT MOLDS
Filed July 14, 1922
1,501,655
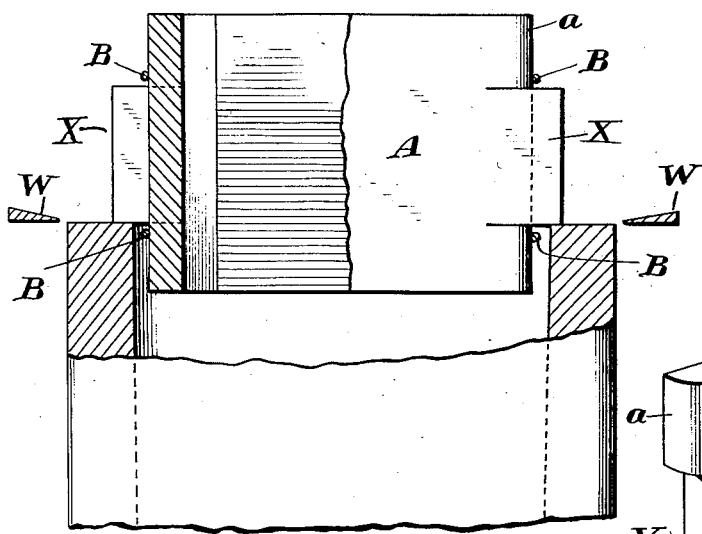
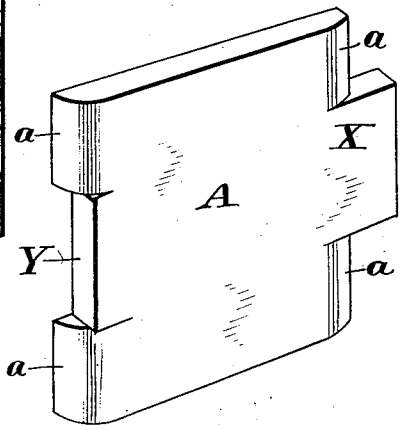
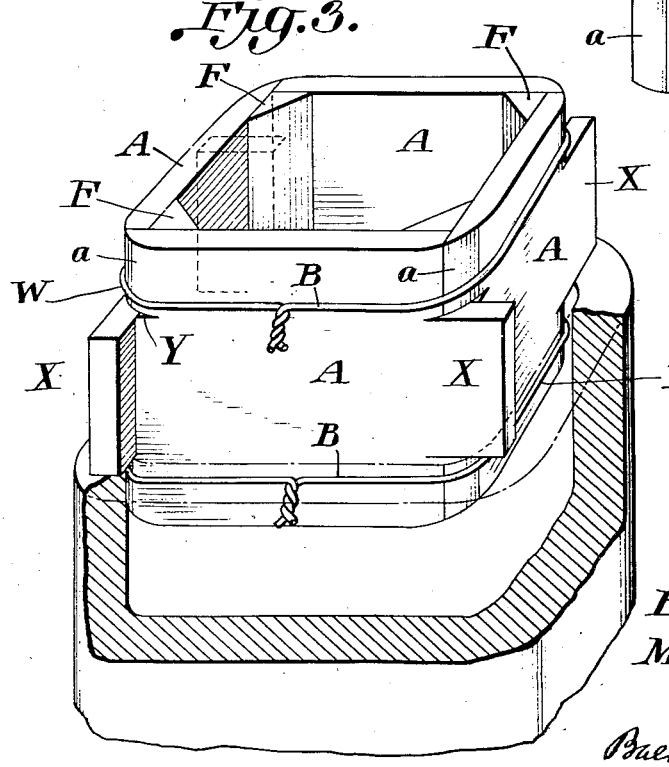
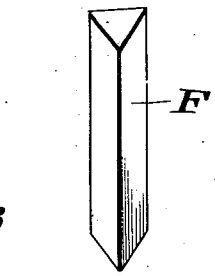
Inventors
Emil Gathmann
Mark Gathmann
by their Attorneys
Baldwin Wight Patented July 15, 1924.

1,501,655

UNITED STATES PATENT OFFICE.

EMIL GATHMANN AND MARK GATHMANN, OF BALTIMORE, MARYLAND.

SHRINK-HEAD CASING FOR INGOT MOLDS.

Application filed July 14, 1922. Serial No. 574,909.

*To all whom it may concern:*

Be it known that we, EMIL GATHMANN and MARK GATHMANN, both citizens of the United States, and both residing in Baltimore, State of Maryland, have invented certain new and useful Improvements in Shrink-Head Casings for Ingot Molds, of which the following is a specification.

This invention relates to what are known in the art as "shrink head casings" or "feeders" for ingot molds. A feeder of the same general construction as that forming the subject matter of this invention is shown in Letters Patent of the United States No. 1,137,264 granted to Emil Gathmann April 27, 1915. That patent shows a feeder made of sections of fire-brick or similar refractory material joined at the corners and bound together in such manner as to provide a complete feeder adapted to be supported on or suspended in a metallic ingot mold. No integral means, however, were included in this construction for interlocking the feeder sections with each other, and the means shown for supporting the feeder on the mold consists of outwardly projecting metal plates inserted in the feeder at its corners.

The object of our present invention is to provide a feeder made in sections of such shape that they may be cheaply molded, readily packed and shipped, and quickly and securely assembled and connected for use and which are provided with integral means whereby they may be supported on the top of a mold.

In carrying out our invention we form a refractory feeder of a suitable number of sections having integral interlocking means at their opposite ends whereby the several sections may be joined and held in place. Wire may be wrapped around the sections when assembled to prevent them from separating and the corners of the feeders may be reinforced by fillets which cover the joints. The joints may be more completely closed if desired by mortar, loam, or other suitable material. The interlocking feeder sections are so constructed that they provide integral projections which are adapted to rest on the top of the mold and thus support the feeder thereon.

In the accompanying drawings:—

Figure 1 is a view partly in side elevation and partly in section of part of an ingot mold and a feeder constructed in accordance with our present invention.

Figure 2 is a perspective view of one of the preferred forms of feeder sections.

Figure 3 is a perspective view of the feeder resting on the top of an ingot mold.

Figure 4 is a perspective view of a fillet which may be used.

Our improved feeder may be applied to molds of various kinds, the details of which are, therefore, not illustrated.

The feeder as a whole may be rectangular or of other polygonal shape. It is here shown as rectangular for purposes of illustration.

Each feeder section A is made of fire-brick or other suitable refractory material. It is of general rectangular shape, its opposite edges being preferably rounded as indicated at $a$ and it is formed at its sides with integral interlocking devices. These may be of different forms but preferably consist of tongues and recesses X and Y as shown most clearly in Figure 2. These devices are so made that the tongue of one section interlocks with the recess of an adjacent section as indicated in Figure 3, and thus the several sections are joined to form a complete feeder.

The feeder as a whole is considerably smaller in cross-section than the top of the mold cavity so that the lower end of the feeder may project to a slight extent into the mold as indicated in Figure 1, and in order to support the feeder on the top of the mold the tongues X are prolonged to a slight extent as shown.

In this way the feeder sections can be cheaply made and are in such form that they may be readily packed and shipped without danger of breakage or injury and may be quickly assembled and connected so that they may be placed on a mold and supported in working position. If it be desirable to adjust the height of the feeder in the mold it may be done by means of wedges W or other suitable devices. No other means are necessarily employed to hold the feeder sections in place, but for additional security, wire B may be wrapped around the feeder in the manner indicated. The joints may be closed if desired by mortar, cement, or other suitable material and if desired fillets F may be placed at the corners and cemented to the feeder in any suitable way.

Obviously the shrink head casing is reversible, that is, instead of being placed as shown in Figures 1 and 3, it may be turned upside down and will operate equally well.

In practice wedges or blocks W are preferably placed between the upper surface of the metallic mold and the projections or ears for supporting or suspending the shrink head or mold top at any desired height in the chambered portion of the mold.

After teeming or pouring the ingot, these wedges or blocks may be readily removed and the mold top or shrink head will then rest upon the solidifying ingot and thus freely move downward with the ingot during the shrinkage thereof. Shrinkage cracks at the junction of the ingot portion cast in the metallic mold and the refractory mold or shrink head top are thus avoided. It will, furthermore, be observed that a substantial clearance is provided for between the outside of the shrink head and the inner walls of the mold chamber to allow the shrink head to be moved vertically without coming into contact with the mold walls. The projections X can, if desired, be knocked off with a hammer with ease because the shrink head is made of fire brick or similar material which may be easily cracked.

We claim as our invention:

1. A shrink head casing made of a plurality of sections having integral interlocking devices at their ends for joining the sections to complete the feeder, integral parts of said devices being prolonged to provide means for supporting the feeder on a mold.

2. A shrink head casing made of a plurality of sections having interlocking tongues and recesses at their ends to complete the feeder with the tongues projecting from the feeder to provide supports for the feeder on the mold top.

3. A shrink head casing made of a plurality of flat sections having integral interlocking devices at their ends for joining the sections to complete the feeder, and fillets secured in the corners of the feeder to close the joints.

4. A shrink head casing made of a plurality of flat sections having rounded ends and formed with tongues and recesses which interlock with each other with the tongues projecting beyond the sides of the feeder to provide supports therefor.

5. A feeder for ingot molds, comprising a body portion formed of a series of longitudinal sections provided with interlocking means for holding together said sections.

6. A feeder for ingot molds, comprising a body portion formed of a series of longitudinal sections having interlocking means for holding said sections together and extending beyond the outer wall of the body portion and forming means for supporting the feeder on the upper end of the mold.

7. A feeder for ingot molds comprising a body portion formed of a series of longitudinal sections having integrally formed interlocking means for holding said sections together and extending beyond the outer walls of the body portion and forming means for supporting the feeder on and partially within the upper end of the mold.

8. A feeder for ingot molds, comprising a body portion formed of a series of longitudinal sections having interlocking means for holding said sections together, said interlocking means being, and said interlocking means forming means for supporting the feeder on the upper end of the ingot mold.

9. A feeder for ingot molds comprising a body portion formed of a series of longitudinal sections made of refractory brick material having interlocking means for holding said sections together, said interlocking means being and said interlocking means forming means for supporting the feeder on and partially within the upper end of the mold.

10. A feeder for ingot molds, comprising a body portion formed of a series of longitudinal sections having interlocking means intermediate the ends and forming means for supporting the feeder on the upper end of the mold.

11. A feeder for ingot molds, comprising a body portion formed of a series of longitudinal sections having interlocking means for holding said sections together, said interlocking means being intermediate the ends and extending beyond the outer wall thereof and forming means for supporting the feeder on the upper end of the mold.

12. A feeder for ingot molds comprising a body portion formed of a series of longitudinal sections of refractory brick material having interlocking means for holding said sections together, said interlocking means being intermediate the ends and extending beyond the outer walls of the sections and thus forming means for supporting the feeder on and partially within the upper end of the mold.

13. A feeder for ingot molds, comprising a body portion formed of a series of longitudinal sections having interlocking means at the abutting corners for holding said sections together and forming means for supporting the feeder on the upper end of the ingot mold.

14. A feeder for ingot molds, comprising a body portion formed of a series of longitudinal sections having interlocking means at the abutting edges for holding said sections together and extending beyond the outer wall thereof and forming means for supporting the feeder on the upper end of the ingot mold.

15. A feeder for ingot molds, comprising a body portion formed of a series of longitudinal sections, a series of interlocking lugs holding the sections together and extending beyond the outer walls of the sections, and a strengthening and retaining band around the sections.

16. A feeder for ingot molds comprising a body portion formed of a series of longitudinal sections of refractory material, a series of lugs integrally formed with the sections for holding said sections together and extending beyond the outer walls of the sections and a retaining and strengthening band around the sections.

17. A feeder for ingot molds comprising a body portion formed of a series of longitudinal sections of refractory material, lugs integrally formed with the sections and adapted to hold said sections together, said lugs extending beyond the outer walls of the sections, and a retaining band for locking the said lugs in the assembled position of the feeder.

18. A feeder for ingot molds comprising a body portion formed of a series of longitudinal sections of refractory material, lugs integrally formed with the sections and adapted to hold said sections together, said lugs extending beyond the outer walls of said sections and being adapted to support the feeder with either end in the mold, and a retaining band for locking the said lugs in the assembled position of the feeder.

19. A reversible feeder for ingot molds comprising a refractory brick casing with integral projections located on its outer body portion and adapted to support the feeder from the top of the mold with either end of the casing adapted to extend to approximately a like distance within the upper chamber of the mold.

20. A metallic ingot mold provided with a separable top portion of refractory brick material adapted to extend within the upper chambered portion of the mold with an open clearance of substantial amount between the outer walls of said top portion and the inner walls of the chambered lower portion of the mold, and projections integral with the separable top portion adapted to rest on the top of the mold for freely suspending the same from the upper face of the metallic ingot mold.

21. The combination with a mold, of a feeder or shrink head therefor, through which the metal is poured, and integral, non-metallic means on the shrink head for sustaining it on the mold and devices engaging said means for holding the feeder at the desired elevation.

22. The combination with a mold of a feeder or shrink head therefor of refractory material through which the metal is poured and integral means on the shrink head for sustaining it on the mold and devices engaging said means for holding the feeder at the desired elevation during the teeming of the mold, the said devices being adapted to be readily detached at the conclusion of the teeming or pouring of the mold to prevent cracking and changing of the ingot during its solidification and consequent shrinkage.

23. The combination with a mold, of a feeder or shrink head therefor of refractory material, through which the metal is poured and which has integral projections for sustaining the feeder on the top of the mold, and detachable devices insertable between said projections and the top of the mold for holding the feeder at the desired elevation.

24. The combination with a mold of a feeder or shrink head therefor of refractory material through which the metal is poured and which has integral projections for sustaining the feeder on the top of the mold and detachable devices insertable between said projections and the top of the mold for holding the feeder at the desired elevation during teeming of the mold.

25. The combination with a metallic ingot mold of a feeder or shrink head casing of refractory material through which the metal is poured and which casing has integral projections for sustaining it partially within and partially above the upper chambered portion of the mold and detachable devices insertable between said projections and the top of the mold for holding the feeder casing in the desired elevation.

In testimony whereof, we have hereunto subscribed our names.

EMIL GATHMANN.
MARK GATHMANN.